United States Patent [19]
Morii et al.

[11] Patent Number: 5,589,146
[45] Date of Patent: Dec. 31, 1996

[54] METHOD FOR TREATING AMMONIA

[75] Inventors: Atsushi Morii; Osamu Naito; Toshiyuki Onishi; Hitoshi Nakamura, all of Nagasaki; Kouzo Iida, Hiroshima, all of Japan

[73] Assignee: Mitsubishi Jukogyo Kaisha, Japan

[21] Appl. No.: 626,577

[22] Filed: Apr. 2, 1996

Related U.S. Application Data

[63] Continuation of Ser. No. 169,606, Dec. 17, 1993, abandoned.

[30] Foreign Application Priority Data

Dec. 21, 1992 [JP] Japan ..................... 4-339940

[51] Int. Cl.$^6$ ........................................ C01C 3/00
[52] U.S. Cl. .................... 423/237; 423/239.1; 423/239.2
[58] Field of Search .................... 95/92, 94; 423/237, 423/239.1, 239.2

[56] References Cited

U.S. PATENT DOCUMENTS 4,169,814  10/1979  Inaba et al. .............................. 252/441

FOREIGN PATENT DOCUMENTS

| 0261610A1 | 3/1988 | European Pat. Off. .................... 53/36 |
| 0268118A2 | 5/1988 | European Pat. Off. .................... 53/34 |
| 0299047A1 | 11/1988 | European Pat. Off. .................... 53/36 |
| 0567964A2 | 11/1993 | European Pat. Off. .................... 53/36 |
| 54-110971 | 8/1979 | Japan . |

OTHER PUBLICATIONS

Translation of EP 0,261,610 Mar. 30, 1980.
Database WPI & JP-A-53 125 962 Feb. 11, 1978.
Database WPI & JP-A-53 077 872 Oct. 7, 1978.
Database WPI & JP-A-50 026 797 Mar. 19, 1975.
Patent Abstracts Of Japan vol. 007, No. 039 & JP-A-57 190 640 Nov. 24, 1982.
Patent Abstracts Of Japan vol. 004, No. 050 & JP-A-55 023 069 Feb. 19, 1980.

*Primary Examiner*—Michael Lewis
*Assistant Examiner*—Thomas G. Dunn, Jr.
*Attorney, Agent, or Firm*—Law Office of Timothy N. Trop

[57] ABSTRACT

A method for treating ammonia in an exhaust gas on the downstream side of a dry denitration device using ammonia as a reducing agent comprises the step of alternately carrying out ammonia adsorption and ammonia desorption/decomposition to continuously treat ammonia in the exhaust gas in a plurality of constitutional units parallelly connected on an exhaust gas line, the aforesaid constitutional units being constituted so as to carry out the steps of adsorbing/removing ammonia in an ammonia adsorbent-filling tower disposed at a position, where an exhaust gas temperature is 200° C. or less, on the downstream side of the dry denitration device; heating, up to a temperature of 300° C. or more, the ammonia adsorbent-filling tower on which ammonia is adsorbed in a saturated state, to desorb ammonia; and decomposing ammonia in an ammonia decomposition catalyst-filling tower disposed on a desorption ammonia gas line.

4 Claims, 2 Drawing Sheets

TIME

METHOD FOR TREATING AMMONIA

This is a continuation of application Ser. No. 08/169,606, filed Dec. 6, 1993 now abandoned.

FIELD OF THE INVENTION AND RELATED ART STATEMENT

The present invention relates to a method for treating ammonia leaked on the downstream side of a dry denitration device using ammonia as a reducing agent.

At present, a method for treating ammonia (hereinafter referred to as "$NH_3$") in an exhaust gas on the downstream side of a dry denitration device using $NH_3$ as a reducing agent has not been put to a practical use yet. In this connection, as ideas, there have been conceived, for example, an invention of the prior application of the present applicant, i.e., a system of installing an $NH_3$ decomposition catalyst layer on the downstream side of a denitration device, and another undisclosed invention of the prior application of the present applicant, i.e., a system in which $NH_3$ is adsorbed/removed by an $NH_3$ adsorbent and the desorbed $NH_3$ is then returned to the inlet of a denitration device again.

In the above-mentioned system of installing the $NH_3$ decomposition catalyst layer on the downstream side of the denitration device, the $NH_3$ decomposition catalyst has an extremely limited tolerance of an operation temperature, and therefore, in the case that, for example, as in a boiler, temperature changes within the range of from about 200° to 450° C. between a low load and a steady load at the outlet of the denitration device, it is difficult to stably decompose $NH_3$ all over the load range. Furthermore, in the above-mentioned other system in which $NH_3$ is adsorbed at a low temperature and then desorbed by raising the temperature, and an $NH_3$-containing (desorption) gas is returned to the inlet of the denitration device, the $NH_3$ concentration in the desorption gas is extremely heightened in a transition period. Thus, when the concentrated gas is directly returned to the inlet of the denitration device, the $NH_3$ concentration at the inlet of the denitration device is also transiently extremely increased, so that the $NH_3$ concentration at the outlet of the denitration device is also increased inconveniently.

OBJECT AND SUMMARY OF THE INVENTION

In view of the above-mentioned technical level, an object of the present invention is to provide a method capable of avoiding the above-mentioned disadvantages, i.e., a method by which an $NH_3$ concentration at the outlet of a denitration device can be stably controlled over a varying load range.

The present invention is directed to a method for treating ammonia in an exhaust gas on the downstream side of a dry denitration device using ammonia as a reducing agent which comprises the steps of adsorbing/removing ammonia in the exhaust gas in an ammonia adsorbent-filling tower disposed at a position, where an exhaust gas temperature is 200° C. or less, on the downstream side of the dry denitration device; heating, up to a temperature of 300° C. or more, the ammonia adsorbent-filling tower on which ammonia is adsorbed in a saturated state, to desorb ammonia; and decomposing ammonia in an ammonia decomposition catalyst-filling tower disposed on a desorption ammonia gas line.

Furthermore, the present invention is also directed to a method for treating ammonia in an exhaust gas on the down-stream side of a dry denitration device using ammonia as a reducing agent which comprises the step of alternately carrying out ammonia adsorption and ammonia desorption/decomposition to continuously treat ammonia in the exhaust gas in a plurality of constitutional units parallelly connected on an exhaust gas line, the aforesaid constitutional units being constituted so as to carry out the steps of adsorbing/removing ammonia in an ammonia adsorbent-filling tower disposed at a position, where an exhaust gas temperature is 200° C. or less, on the downstream side of the dry denitration device; heating, up to a temperature of 300° C. or more, the ammonia adsorbent tower on which ammonia is adsorbed in a saturated state, to desorb ammonia; and decomposing ammonia in an ammonia decomposition tower disposed on a desorption ammonia gas line.

In the present invention, suitable examples of the $NH_3$ adsorbent with which the adsorbent-filling tower is filled include titanium oxide, alumina and zeolite. In addition, suitable examples of the $NH_3$ decomposition catalyst with which the ammonia decomposition tower is filled include active metals such as copper, cobalt, nickel and iron supported on zeolite.

The $NH_3$ adsorbent-filling tower is disposed at the position, where the exhaust gas temperature in a main flue is 200° C. or less, on the downstream side of the dry denitration device, and therefore $NH_3$ in the exhaust gas in the main flue on the downstream side of the dry denitration device can be stably reduced within the range of from the high load to the low load of an exhaust gas generation source. Furthermore, $NH_3$ adsorbed by the $NH_3$ adsorbent-filling tower is heated up to a temperature of 300° C. or more to desorb $NH_3$, and the desorbed $NH_3$ is led into the desorption $NH_3$ gas line and then decomposed in the decomposition catalyst-filling tower provided on the line. Accordingly, even when the exhaust gas discharged from the decomposition catalyst-filling tower is returned to the exhaust gas generation source, the $NH_3$ concentration in the main flue does not increase.

Moreover, according to the above-mentioned second invention, the above-mentioned treatment can be continuously carried out.

DETAILED DESCRIPTION OF PREFERRED EMBODIMENTS $NH_3$ adsorption properties of an adsorbent were confirmed in Experimental Example 1, and $NH_3$ decomposition properties of the adsorbent were confirmed in Experimental Example 2.

EXPERIMENTAL EXAMPLE 1

Figure 3:
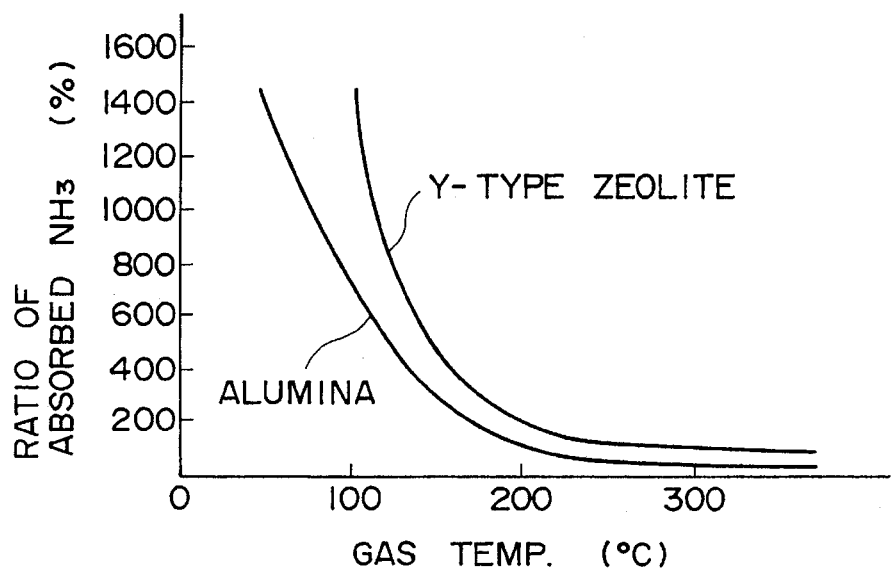
FIG. 3 is a graph showing the temperature dependence of the amount of ammonia adsorbed by an ammonia adsorbent which can be used in the present invention.

An $NH_3$ adsorbent comprising 80% of Y-type zeolite and 20% of a molding auxiliary and another $NH_3$ adsorbent comprising 80% of alumina and 20% of a molding auxiliary were molded into pellets having a diameter of 3 mm, and their adsorption properties were confirmed under the following conditions. As a result, it was apparent that the concentration of adsorbed $NH_3$ (a ratio of the amount of adsorbed $NH_3$) increased at 200° C. or less in both the cases, as shown in FIG. 3.

Gas flow rate: 400N liters/hr
Temperature: 100° C. and 300° C.
Composition of the exhaust gas:
  $NO_x$: 1 ppm
  $NH_3$: 100 ppm
  $O_2$: 14%
  $H_2O$: 5%
  $N_2$: balance

EXPERIMENTAL EXAMPLE 2

Figure 4:
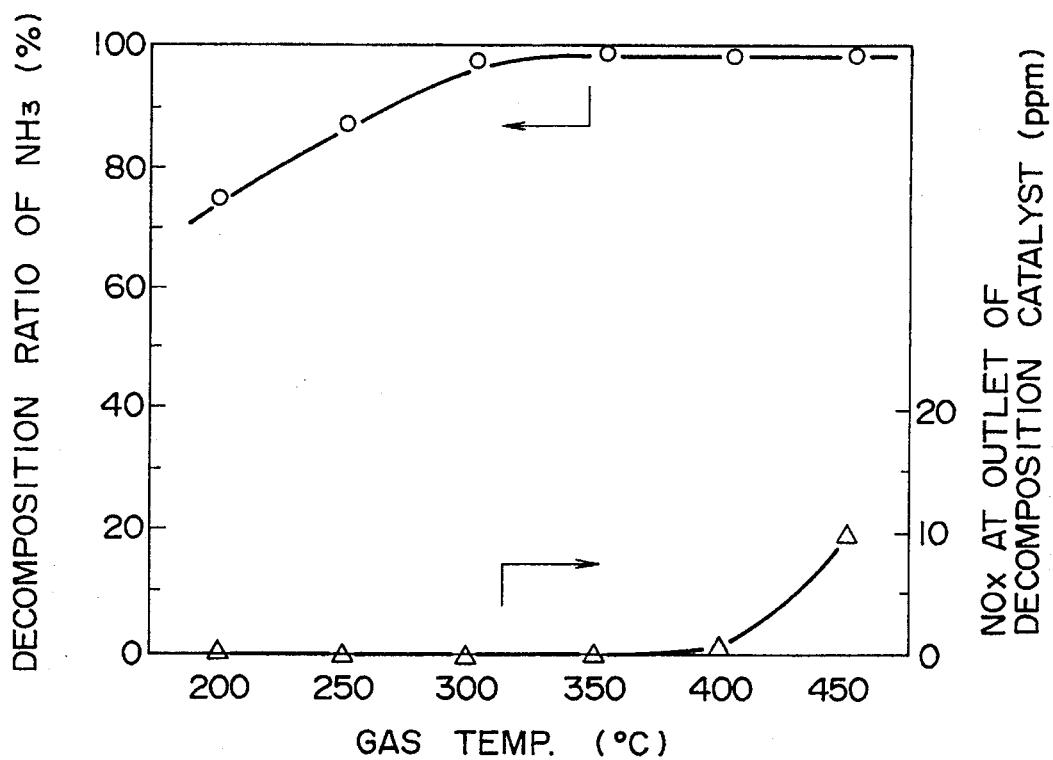
FIG. 4 is a graph showing the temperature dependence of an ammonia decomposition ratio and an $NO_x$ generation ratio of an ammonia decomposition catalyst which can be used in the present invention.

An $NH_3$ decomposition catalyst comprising 60% of silica, 30% of alumina and 7% of copper and a balance of a molding auxiliary was molded into a honeycomb shape having a pitch of 5 mm, and decomposition properties of the catalyst were measured under the following conditions. The results are shown in FIG. 4. It is apparent from the results of FIG. 4 that the decomposition activity (decomposition ratio) of $NH_3$ was high at a gas temperature of from 300° to 400° C., but at 300° C. or less, the decomposition activity is low. At 400° C., the generation of $NO_x$ occurred, and this generation increased with the rise of the temperature. Therefore, it was understood that the direct installation of an $NH_3$ decomposition catalyst tower in a flue on the downstream side of a denitration device using $NH_3$ as a reducing agent was not preferable to decompose/remove $NH_3$ in an exhaust gas on the downstream side of the denitration device.

SV value: about 1,600 $H^{-1}$
Gas flow rate: 220N liters/hr
Composition of the exhaust gas:
  $NH_3$: 20 ppm
  $CO_2$: 7%
  $O_2$: 14.7%
  $H_2O$: 6%
  $N_2$: balance On the basis of the above-mentioned results, the present invention has been carried out by the following procedures.

EXAMPLE

Figure 1:
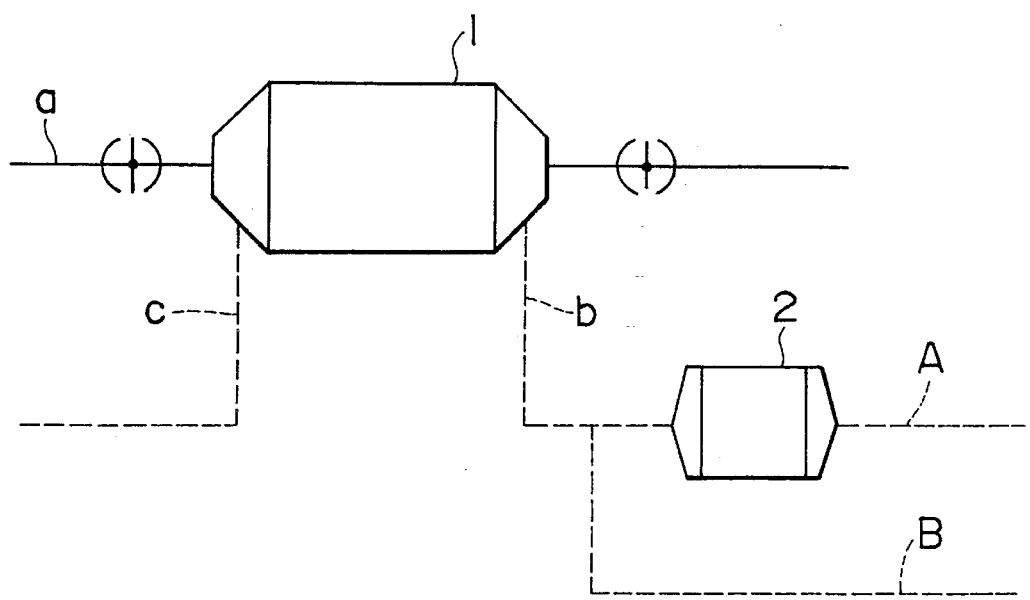
FIG. 1 is an illustrative view comparing an embodiment of the present invention with a comparative example.

As shown in FIG. 1, an $NH_3$ adsorbent-filling tower 1 filled with an $NH_3$ adsorbent comprising 80% of alumina and 20% of a molding auxiliary was provided on an exhaust gas line a of an exhaust gas generation source (not shown). On a desorption line b extending from the $NH_3$ adsorbent-filling tower 1, there were provided a system A in which an $NH_3$ decomposition catalyst-filling tower 2 filled with an $NH_3$ decomposition catalyst comprising 60% of silica, 30% of alumina, 7% of copper and a balance of a molding auxiliary was installed, and another system B for comparison in which the catalyst-filling tower was not installed.

Figure 2:
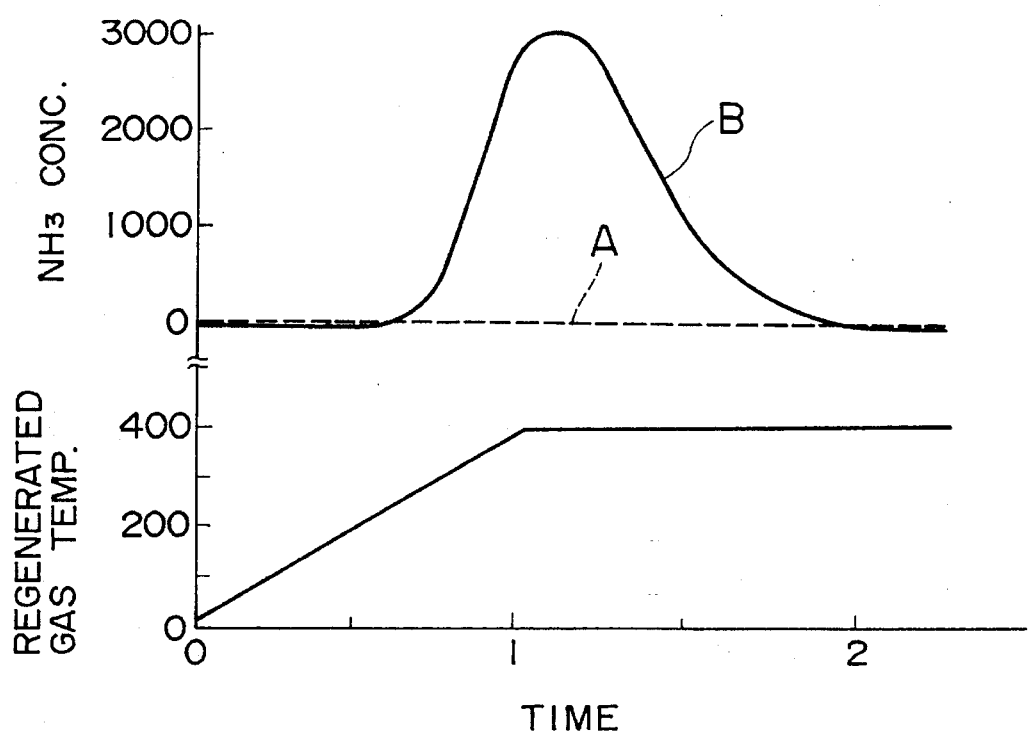
FIG. 2 is a graph comparing the effect of the embodiment in FIG. 1 with that of the comparative example.

An exhaust gas having the same composition as in Experimental Example 1 was fed through the exhaust gas line a, and $NH_3$ was adsorbed at an exhaust gas temperature of 100° C. to a saturated state in the $NH_3$ adsorbent-filling tower 1. Afterward, the feed of the exhaust gas was stopped, and a reproduced gas was heated in a manner shown in FIG. 2 and then fed through a reproduced gas line C. Afterward, the change of the $NH_3$ concentration in the desorption line b was confirmed, and as a result, the results shown in FIG. 2 were obtained.

That is, in the system B of the desorption line b, the rise of the $NH_3$ concentration was observed, but in the system A in which the $NH_3$ decomposition catalyst-filling tower 2 was installed, any rise of the $NH_3$ concentration was not observed, whereby it was confirmed that the decomposition/removal of $NH_3$ in the exhaust gas was carried out.

In this connection, where the ammonia decomposition tower is disposed on an ammonia desorption line that is installed separately from the main stream of the denitration device, the gas amount in the desorption line b was in the range of from 1/50 to 1/100 of the exhaust gas amount in the exhaust gas line a, and therefore it was understood that the amount of the catalyst could be decreased, in contrast to the case where the $NH_3$ decomposition catalyst-filling tower 2 was directly installed on the exhaust gas line a.

When the present invention is applied to a real plant, a plurality of constitutional units shown in FIG. 1 comprising the $NH_3$ adsorbent-filling tower 1 and the $NH_3$ decomposition catalyst-filling tower 2 are parallelly connected on the exhaust gas line a, and the adsorption of $NH_3$ and the decomposition/removal of $NH_3$ are alternately carried out, whereby in the dry denitration device, $NH_3$ in the exhaust gas on the downstream side of the device can be continuously treated.

As is apparent from the foregoing, according to the present invention, an $NH_3$ concentration in an exhaust gas can be stably inhibited to a low level even at the time of the load change of an exhaust gas generation source.

We claim:

1. A method of treating ammonia in an exhaust gas downstream of a dry denitration device using ammonia as a reducing agent, comprising the steps of adsorbing ammonia in an ammonia adsorbent-filled tower at a point where said exhaust gas temperature is less than 200° C., conducting a gas heated to 300° to 400° C. into said adsorbing tower saturated with ammonia adsorption so as to desorb ammonia by heating, and decomposing ammonia by conducting the ammonia-desorbed gas into an ammonia decomposition tower containing an ammonia decomposition catalyst which is disposed on an ammonia desorption line that is installed separately from the main stream of the dry denitration device.

2. The method of claim 1 further including the step of connecting a plurality of said adsorbing towers and said ammonia decomposition towers together in parallel series, so as to carry out ammonia adsorption and ammonia decomposition alternately, thereby treating ammonia in the exhaust gas in a continuous manner.

3. The method of claim 1 wherein the step of adsorbing ammonia includes the step of using Y-type zeolite as an adsorbent in said adsorbent-filled tower.

4. The method of claim 1 wherein the step of adsorbing ammonia includes the step of using alumina as an adsorbent in said adsorbent-filled tower.

* * * * *